(12) United States Patent
Wiffen

(10) Patent No.: US 11,411,591 B1
(45) Date of Patent: Aug. 9, 2022

(54) ROBUST RF SELF INTERFERENCE CANCELLATION CIRCUIT ADAPTIVE TUNING ALGORITHM

(71) Applicant: Kabushiki Kaisha Toshiba, Tokyo (JP)

(72) Inventor: Alfred Daniel Wiffen, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/354,647

(22) Filed: Jun. 22, 2021

(51) Int. Cl.
*H04B 1/38* (2015.01)
*H04B 1/10* (2006.01)

(52) U.S. Cl.
CPC .................................. *H04B 1/1081* (2013.01)

(58) Field of Classification Search
CPC ...... H04B 1/10; H04B 1/1081; H04B 1/1027; H04B 1/1036; H04B 1/123; H04B 1/7097; H04B 1/7101; H04B 1/711; H04B 2001/7152
See application file for complete search history.

(56) References Cited

U.S. PATENT DOCUMENTS

| 2016/0088548 | A1* | 3/2016 | Zhao | H04B 17/345 455/422.1 |
| 2016/0182104 | A1* | 6/2016 | Xue | H04J 11/0056 455/78 |
| 2016/0218769 | A1* | 7/2016 | Chang | H04B 1/525 |
| 2017/0264420 | A1 | 9/2017 | Bharadia et al. | |

OTHER PUBLICATIONS

U.S. 16/951,327, filed Nov. 18, 2020, Wiffen, et al.
Kenneth E. Kolodziej, et al., "Multitap RF Canceller for In-Band Full—Duplex Wireless Communications," IEEE Transactions on Wireless Communications, vol. 15, No. 6, Jun. 2016, pp. 4321-4334.
Joose Tamminen, et al., "Digitally-Controlled RF Self-Interfere Canceller for Full-Duplex Radios," 2016 24th European Signal Processing Conference (EUSIPCO), 2016, pp. 783-787.
Dinesh Bharadia, et al., "Full Duplex Radios", Proceedings of the ACM SIGCOMM 2013 Conference on SIGCOMM (SIGCOMM '13). Association for Computing Machinery, 2013, pp. 375-386.
(Continued)

*Primary Examiner* — Tuan Pham
(74) *Attorney, Agent, or Firm* — Oblon, McClelland, Maier & Neustadt, L.L.P.

(57) ABSTRACT

A method of tuning a self-interference cancellation circuit, wherein the self-interference cancellation circuit comprises a filtering means configured to vary a phase and an amplitude of a transmit signal based on a first filter weight. The method comprising transmitting a first transmit signal, receiving a first received signal in response to transmitting the first transmit signal; estimating, based on the first received signal, a first derivate of a cost function with respect to the first filter weight; estimating, based on the first received signal, a second derivative of the cost function with respect to the first filter weight; determining a first step size based on the second derivative; calculating an updated first filter weight based on the first filter weight, the first step size, and the first derivative; and updating the filtering means based on the updated first filter weight.

18 Claims, 8 Drawing Sheets

(56) References Cited

OTHER PUBLICATIONS

Liyuan Zhang, et al., "Design and Implementation of Adaptive Multi-Tap Analog Interference Canceller", IEEE Transactions On Wireless Communications, vol. 18, No. 3, Mar. 2019, pp. 1698-1706.
Anthony Chan Carusone, et al. "Analog Filter Adaptation Using a Dithered Linear Search Algorithm," 2002 IEEE International Symposium on Circuits and Systems. Proceedings, 2002, pp. 269-272.
Zhiliang Zhang, et al., "Full Duplex 2×2 MIMO Radios," 2014 Sixth International Conference on Wireless Communications and Signal Processing (WCSP), 2014, 6 pages.
Visa Tapio, et al., "Real Time Adaptive RF and Digital Self-Interference Cancellation for Full-Duplex Transceivers," 2016 50th Asilomar Conference on Signals, Systems and Computers, 2016, pp. 1558-1562.
Kenneth E. Kolodziej, et al., "In-Band Full-Duplex RF Canceller Tuning using Adaptive Learning Rate Functions," 2020 IEEE Radio and Wireless Symposium (RWS), pp. 165-168.

\* cited by examiner

ROBUST RF SELF INTERFERENCE CANCELLATION CIRCUIT ADAPTIVE TUNING ALGORITHM

FIELD

Embodiments described herein relate generally to an apparatus for self-interference cancellation and a method of tuning said apparatus.

BACKGROUND

Full Duplex (FD) communication is the Simultaneous Transmission And Reception (STAR) of wireless signals on the same frequency at the same time. Full Duplex (FD) technologies have a range of applications. For example, Full Duplex (FD) technologies have been approved as an option for the 802.11ax WiFi standard. Other applications for Full Duplex (FD) technologies are also being explored for example in wireless power transfer, mmWave backhaul and radar.

A known challenge with Full Duplex (FD) technologies is achieving sufficient cancellation of self-interference. Self-interference arises in Full Duplex (FD) technologies when a high power transmit signal leaks into the receiver path. Achieving sufficient self-interference cancellation enables the detection of the desired signal (e.g. a transmission from a communication node), which has a power many orders of magnitude (100+dB) lower than the signal being transmitted.

Known Full Duplex (FD) system architectures cancel self-interference through a combination of multiple technologies including passive isolation (i.e. separating transmit and receive antennas), digital compensation (i.e. compensating the received signal once converted into a digital signal), and Radio Frequency (RF) cancellation. Radio Frequency (RF) cancellation is often applied to cancel out the high power self-interference (SI) leakage prior to the received signal entering a low noise amplifier (LNA). Radio Frequency (RF) cancellation often involves producing an approximate replica of the self-interference signal in the analogue domain, and then using this signal to (at least partially) cancel the self-interference present in the received signal.

It is known to use a multi-tap cancellation filter for Radio Frequency (RF) cancellation. A multi-tap cancellation filter applies variable phase shifts and variable attenuations to multiple delayed copies of the transmit signal in order to create a signal that approximately cancels the self-interference (SI). The properties of the self-interference (i.e. the self-interference channel) change over time due to changes in the wireless propagation environment and drift of components in the transceiver.

In light of this, there is a need to provide a tuning algorithm that quickly converges on a set of filter weights controlling the variable phase shifts and attenuations of the multi-tap cancellation filter that cancel the self-interference effects. In this way, self-interference between the transmitter path and the receiver path is cancelled and proper operation of a full duplex (FD) system can be achieved sooner.

Arrangements of the present invention will be understood and appreciated more fully from the following detailed description, made by way of example only and taken in conjunction with drawings in which.

DETAILED DESCRIPTION

Figure 1:
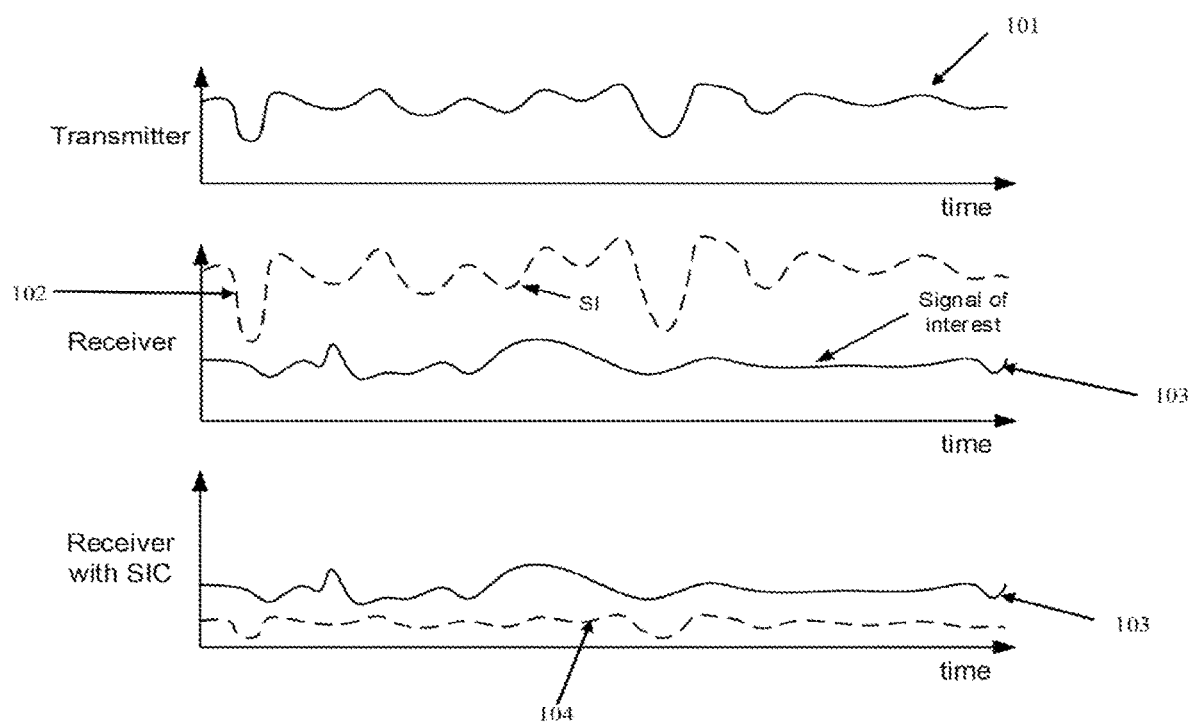
FIG. 1 shows a collection of signals in a Full Duplex (FD) system according to an embodiment.

According to a first aspect there is provided a method of tuning a self-interference cancellation circuit, wherein the self-interference cancellation circuit comprises a filtering means configured to vary a phase and an amplitude of a transmit signal based on a first filter weight. The method comprising: transmitting a first transmit signal, receiving a first received signal in response to transmitting the first transmit signal; estimating, based on the first received signal, a first derivate of a cost function with respect to the first filter weight; estimating, based on the first received signal, a second derivative of the cost function with respect to the first filter weight; determining a first step size based on the second derivative; calculating an updated first filter weight based on the first filter weight, the first step size, and the first derivative; and updating the filtering means based on the updated first filter weight.

In an embodiment the first step size is determined only once during tuning.

In an embodiment the first received signal is a self-interference signal generated by transmission of the first transmit signal.

In an embodiment the first step size is calculated according to a first predetermined number divided by the second derivative of the cost function with respect to the first filter weight. In an embodiment the first predetermined number is between 0 and 1. In an embodiment the first predetermined number is 1.

In an embodiment estimating the first derivative of the cost function with respect to the first filter weight further comprises: numerically estimating the first derivative the cost function with respect to the first filter weight based on a Received Signal Strength Indication (RSSI) of the first received signal. And estimating the second derivative of the cost function with respect to the first filter weight further comprises: numerically estimating the second derivate of the cost function with respect to the first filter weight based on the Received Signal Strength Indication (RSSI) of the first received signal.

In an embodiment the first derivative of the cost function and the second derivative of the cost function are numerically estimated using a central difference formula.

In an embodiment the method further comprises: varying the first filter weight by a first delta before transmitting the first transmit signal; varying the first filter weight by a second delta after receiving the first received signal; re-transmitting the first transmit signal; and receiving a second received signal in response to re-transmitting the first transmit signal. Wherein: numerically estimating the first derivative of the cost function with respect to the first filter weight comprises: calculating a first Received Signal Strength Indication ($RSSI(w_i[c]+\Delta)$) of the first received signal, wherein the first received signal is received in response to transmitting the first transmit signal with the first filter weight varied by the first delta; calculating a second Received Signal Strength Indication (($RSSI(w_i[c]-\Delta)$) of the second received signal, wherein the second received signal is received in response to re-transmitting the first transmit signal with the first filter weight varied by the second delta; and calculating the first derivative of the cost function with respect to the first filter weight based on the first Received Signal Strength Indication ($RSSI(w_i[c]+\Delta)$) of the first received signal and the second Received Signal Strength Indication (($RSSI(w_i[c]-\Delta)$) of the second received signal.

In an embodiment the first derivative of the cost function with respect to the first filter weight is calculated according to:

$$\left.\frac{\delta J}{\delta w_i^{re}}\right|_{w_i[c]} \approx \frac{RSSI(w_i[c]+\Delta) - RSSI(w_i[c]-\Delta)}{2P\Delta}.$$

In an embodiment the first delta is equal in magnitude and opposite in sign to the second delta.

In an embodiment the method further comprises: re-transmitting the first transmit signal without varying the first filter weight; and receiving a third received signal in response to re-transmitting the first transmit signal without the first filter weight being varied. Wherein, numerically estimating the second derivate of the cost function with respect to the first filter weight further comprises: calculating a third Received Signal Strength Indication ($RSSI(w_i[c])$) of the third received signal; and calculating the second derivative of the cost function with respect to the first filter weight based on the first Received Signal Strength Indication ($RSSI(w_i[c]+\Delta)$), the second Received Signal Strength Indication ($RSSI(w_i[c]-\Delta)$) and the third Received Signal Strength Indication ($RSSI(w_i[c])$).

In an embodiment the second derivative of the cost function with respect to the first filter weight is calculated according to:

$$\left.\frac{\delta^2 J}{\delta w_i^{re2}}\right|_{w_i[c]} \approx \frac{RSSI(w_i[c]+\Delta) - 2RSSI(w_i[c]) + RSSI(w_i[c]-\Delta)}{P\Delta^2}$$

In an embodiment the cost function is a least squares cost function; and the cost function is based on a self-interference signal impulse response and an impulse response of the filtering means.

In an embodiment the method further comprises: determining whether the first filter weight has converged after updating the filtering means; and in response to determining that the first filter weight has not converged: estimating a second first derivate of the cost function with respect to the first filter weight; calculating a second updated first filter weight based on the first filter weight, the first step size, and the second first derivative; and updating the filtering means based on the second updated first filter weight.

In an embodiment the self-interference cancellation circuit comprises a second filtering means configured to vary a phase and an amplitude of the transmit signal based on a second filter weight, and the method further comprises: estimating a first derivate of a cost function with respect to the second filter weight; estimating a second derivative of the cost function with respect to the second filter weight; determining a second step size based on the second derivative of the cost function with respect to the second filter weight; calculating an updated second filter weight based on the second filter weight, the second step size, and the first derivative of the cost function with respect to the second filter weight; and updating the second filtering means based on the updated second filter weight.

In an embodiment the first filter weight comprises a real component and an imaginary component and wherein: estimating a first derivate of a cost function with respect to the first filter weight further comprises estimating the first derivate of the cost function with respect to the real component and the imaginary component of the first filter weight; estimating a second derivative of the cost function with respect to the first filter weight further comprises estimating the second derivative of the cost function with respect to the real component and the imaginary component of the first filter weight. Determining a first step size based on the second derivative further comprises: determining a first step size based on at least one of: the real component based on the second derivative of the cost function with respect to the real component; or the imaginary component based on the second derivative of the cost function with respect to the imaginary component. Calculating an updated first filter weight further comprises: calculating an updated real component of the first filter weight based on: the first derivate of the cost function with respect to the real component, the first step size, and the real component of the first filter weight; and calculating an updated imaginary component of the first filter weight based on: the first derivate of the cost function with respect to the imaginary component, the first step size, and the imaginary component of the first filter weight.

In an embodiment the filtering means is a vector modulator.

In an embodiment the first transmit signal and the first receive signal is a WIFI signal.

In an embodiment the method further comprises periodically retuning the self-interference cancellation filter.

In an embodiment the filtering means comprises a variable phase shifter and a variable attenuator.

According to a second aspect there is provided a method of operating a transceiver, the transceiver comprising a transmit path, a receive path and a self-interference cancellation circuit communicatively coupled between the transmit path and the receive path, the method comprising: tuning the self-interference cancellation circuit according to claim 1; transmitting a second transmit signal via the transmit path; generating, by the self-interference cancellation circuit, a self-interference cancellation signal based on the second transmit signal; receiving a second received signal via the receive path; and cancelling, based on the second received signal and the self-interference cancellation signal, at least a portion of a self-interference that is present in the second received signal.

According to a third aspect there is provided an apparatus for self-interference cancellation comprising a filtering means configured to vary a phase and an amplitude of a transmit signal based on a first filter weight, wherein the apparatus is configured to: transmit a first transmit signal, receive a first received signal in response to transmitting the first transmit signal; estimate, based on the first received signal, a first derivate of a cost function with respect to the first filter weight; estimate, based on the first received signal, a second derivative of the cost function with respect to the first filter weight; determine a first step size based on the second derivative; calculate an updated first filter weight based on the first filter weight, the first step size, and the first derivative; and update the filtering means based on the updated first filter weight.

In an embodiment the apparatus is further configured to calculate the first step size according to a first predetermined number divided by the second derivative of the cost function with respect to the first filter weight.

In an embodiment the apparatus is further configured to: estimate the first derivative of the cost function with respect to the first filter weight by: numerically estimating the first derivative the cost function with respect to the first filter weight based on a Received Signal Strength Indication (RSSI) of the first received signal. And estimate the second derivative of the cost function with respect to the first filter weight by: numerically estimating the second derivate of the cost function with respect to the first filter weight based on the Received Signal Strength Indication (RSSI) of the first received signal.

In an embodiment the first derivative of the cost function and the second derivative of the cost function are numerically estimated using a central difference formula.

In an embodiment the apparatus is further configured to: vary the first filter weight by a first delta before transmitting the first transmit signal; vary the first filter weight by a second delta after receiving the first received signal; re-transmit the first transmit signal; and receive a second received signal in response to re-transmitting the first transmit signal. And wherein: when, numerically estimating the first derivative of the cost function with respect to the first filter weight, the apparatus is further configured to: calculate a first Received Signal Strength Indication (RSSI($w_i[c]+\Delta$)) of the first received signal, wherein the first received signal is received in response to transmitting the first transmit signal with the first filter weight varied by the first delta; calculate a second Received Signal Strength Indication ((RSSI($w_i[c]-\Delta$)) of the second received signal, wherein the second received signal is received in response to re-transmitting the first transmit signal with the first filter weight varied by the second delta; and calculate the first derivative of the cost function with respect to the first filter weight based on the first Received Signal Strength Indication (RSSI ($w_i[c]+\Delta$)) of the first received signal and the second Received Signal Strength Indication ((RSSI($w_i[c]-\Delta$)) of the second received signal.

In an embodiment the apparatus is further configured to re-transmit the first transmit signal without varying the first filter weight; and receive a third received signal in response to re-transmitting the first transmit signal without the first filter weight being varied. Wherein, when numerically estimating the second derivate of the cost function with respect to the first filter weight, the apparatus is further configured to: calculate a third Received Signal Strength Indication (RSSI($w_i[c]$)) of the third received signal; and calculate the second derivative of the cost function with respect to the first filter weight based on the first Received Signal Strength Indication (RSSI($w_i[c]+\Delta$)), the second Received Signal Strength Indication (RSSI($w_i[c]-\Delta$)) and the third Received Signal Strength Indication (RSSI($w_i[c]$)).

In an embodiment the cost function is a least squares cost function; and the cost function is based on a self-interference signal impulse response and an impulse response of the filtering means.

In an embodiment the apparatus is further configured to: determine whether the first filter weight has converged after updating the filtering means; and in response to determining that the first filter weight has not converged: estimate a second first derivate of the cost function with respect to the first filter weight; calculate a second updated first filter weight based on the first filter weight, the first step size, and the second first derivative; and update the filtering means based on the second updated first filter weight.

According to a fourth aspect there is provided a communication apparatus comprising a transmit path, a receive path and an apparatus for self-interference cancellation according to claim 10 communicatively coupled between the transmit path and the receive path, wherein the communication apparatus is configured to: tune the apparatus for self-interference cancellation according to the method of claim 1; transmit a second transmit signal via the transmit path; generate, by the apparatus for self-interference cancellation, a self-interference cancellation signal based on the second transmit signal; receive a second received signal via the receive path; and cancel at least a portion of a self-interference that is present in the second received signal based on the self-interference cancellation signal According to a fifth aspect there is provided a non-transitory computer-readable medium comprising computer program instructions suitable for execution by a processor, the instructions configured to, when executed by the processor: estimate, based on a first received signal, a first derivate of a cost function with respect to a first filter weight, the first filter weight representing an amplitude and a phase shift provided by a filtering means of a self-interference cancellation circuit; estimate, based on the first received signal, a second derivative of the cost function with respect to the first filter weight; determine a first step size based on the second derivative; calculate an updated first filter weight based on the first filter weight, the first step size, and the first derivative; and update the filtering means based on the updated first filter weight.

FIG. 1 shows a collection of signals in a Full Duplex (FD) system according to an embodiment. FIG. 1 shows a first signal 101 that is transmitted by the Full Duplex (FD) system. In an un-compensated system, the received signal comprises a self-interference component 102 and a component representing a signal of interest 103. As will be noted from FIG. 1, the power of the self-interference signal is larger than the signal of interest 103. Consequently, without sufficient cancellation of the self-interference signal, the signal of interest 103 cannot be observed. An example of the waveforms that are present when the receiver uses self-interference cancellation is also shown in FIG. 1. When self-interference cancellation is used a self-interference signal 104 is lower in magnitude than the signal of interest 103. As a result, the signal of interest 103 can be observed and Full Duplex (FD) operation can be achieved.

As discussed above, one way to provide self-interference cancellation is to use Radio Frequency (RF) cancellation. A Radio Frequency (RF) cancellation architecture generally comprises one or more analogue "taps" that each take a portion of the transmit signal from the transmitter chain and apply a delay, phase-shift, and attenuation to the signal before coupling the generated signal to the receiver chain prior to the received signal being inputted into a Low Noise Amplifier (LNA). This architecture effectively acts as an analogue Finite Impulse Response (FIR) filter and aims to emulate the impulse response of the self-interference channel so that the majority of the Self-Interference (SI) in the received signal can be cancelled prior to the signal entering the Low Noise Amplifier (LNA). Using a Radio Frequency (RF) cancellation architecture in this way ensures that the input signal to the Low Noise Amplifier (LNA) has the correct dynamic range for the Low Noise (LNA), thereby preventing the Low Noise Amplifier (LNA) from being overloaded.

Figure 2:
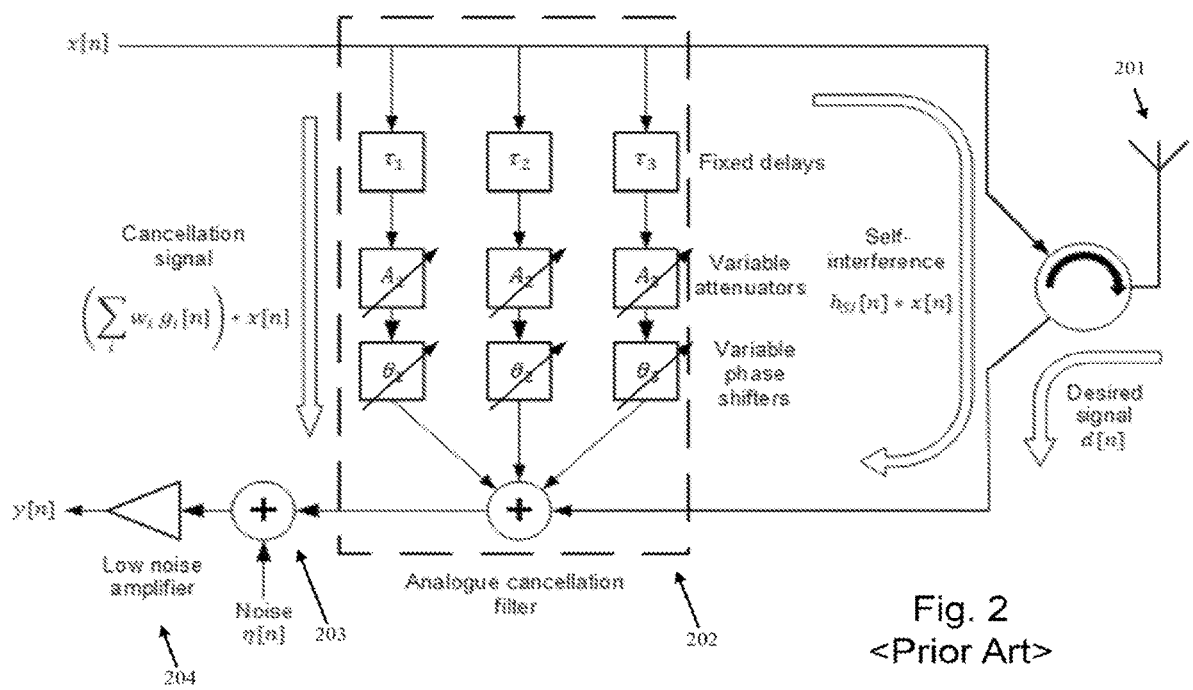
FIG. 2 shows a known Radio Frequency (RF) cancellation architecture.

FIG. 2 shows a known Radio Frequency (RF) cancellation architecture. FIG. 2 shows a Radio Frequency (RF) cancellation architecture having an input transmit signal, x[n]. The transmit signal, x[n], is transmitted via an antenna 201. A desired receive signal, d[n], is received via the antenna 201. This desired receive signal, d[n], could be for example, transmitted by another device in the case when Full Duplex (FD) is used in 802.11ax WiFi. Alternatively the desired receive signal, d[n], could be a reflected signal when Full Duplex (FD) is used in radar. The desired signal, d[n], corresponds to the signal of interest 103 in the example of FIG. 1.

The Radio Frequency (RF) cancellation architecture of FIG. 2 comprises an analogue cancellation filter 202 comprising three taps, each tap having a delay component to delay the input signal, a variable attenuator to attenuate the input signal and a variable phase shifter to shift the phase of the input signal. The tunable elements of each tap (i.e. the variable phase shifter and the variable attenuator) are set using a control voltage supplied by a digital controller (not shown). Alternatively, the analogue cancellation filter could be implemented using vector modulators as the tunable elements.

As show in FIG. 2 the input signal to the analogue cancellation filter 202 is the transmit signal, x[n]. The signals from each tap of the filter are summed to form a signal that approximately cancels any self-interference introduced into the received signal.

A self-interference signal shown in FIG. 2 equals the impulse response of the self-interference channel, $h_{SI}[n]$, convolved with the transmit signal, x[n]. The self-interference signal can be caused by electrical leakage paths and electromagnetic reflections in the local propagation environment. Electrical leakage paths could arise, for example, within the transceiver itself due to electromagnetic coupling between a transmitter chain (i.e. the sequence of components forming the transmitter) and a receiver chain (i.e. the sequence of components forming the receiver). One such leakage path may, in particular, be generated by insufficient isolation between the transmit and receive ports of the circulator connecting to the transmit and receive chains respectively, as well as to the antenna, as shown in FIG. 2. Self-interference can also be generated by reflections of the transmitted signal by the local propagation environment (e.g. objects in the local propagation environment), these reflections are subsequently received and form part of the self-interference present in the received signal. As a result, the self-interference channel will generally vary with time (due to motion in the local environment) and changes in temperature (which affects the properties of the components in the transceiver). Consequently, the analogue cancellation filter 202 must be adaptive to account for these variations in the self-interference channel. In FIG. 2 the properties of the analogue cancellation filter 202 are adapted by varying the phase shifts and attenuation provided by the variable attenuators and variable phase shifters.

The cancellation signal generated by the analogue cancellation filter is represented by:

$$(\sum_i w_i g_i[n])*[n]$$

Where:
n is discrete (digital) time;
x[n] is the transmit signal;
$g_i[n]$ is the impulse response of cancellation tap i (not including the phase shifter); and
$w_i$ is the weight applied to each tap of the filter.

The baseband equivalent effect of the variable phase shift, $\theta_i$, and variable attenuator, $A_i$, on cancellation path i is described by a complex weight, $w_i$, where:

$$w_i = A_i e^{j\theta_i}$$

In FIG. 2 the analogue cancellation filter 202 comprises 3 taps. However for the avoidance of doubt it is emphasized that any number of taps greater than or equal to one may be used instead.

FIG. 2 shows a noise source 203 to represent the electronic noise in the receiver. FIG. 2 also shows a Low Noise Amplifier (LNA) 204. The output of the Radio Frequency (RF) cancellation architecture shown in FIG. 2 after down conversion and sampling is a received signal, y[n], which corresponds to:

$$y[n] = h_{SI}[n]*x[n] + (\sum_i w_i g_i[n])*x[n] + d[n] + \eta[n]$$

where:
$h_{SI}[n]$ is the impulse response of the self-interference channel;
x[n] is the transmit signal;
$(\sum_i w_i g_i[n])*x[n]$ is the cancellation signal generated by the cancellation filter;
d[n] is the desired (received) signal; and
$\eta[n]$ is the receiver noise.

Self-interference cancellation is achieved by choosing the weights of the cancellation filter such that the difference between the self-interference channel impulse response and the cancellation filter impulse response is minimised. The problem of finding the optimum weights of the cancellation filter can be expressed as a standard least squares problem, for which a unique minimising set of weights, $w_i$, exists. This problem can be expressed as:

$$J(w_1, \ldots, w_L) = \sum_n |h_{SI}[n] + \sum_i w_i g_i[n]|^2$$

Where J is the objective function. However, finding the optimum minimising weights, $w_i$, is not straightforward in practice because the self-interference channel impulse response, $h_{SI}[n]$ and the cancellation tap impulse response, $g_i[n]$ are not directly measurable. As a result, it is challenging to use the standard least squares closed form solution in practice.

Filter weight optimisation based on the steepest decent (SD) algorithm has previously been proposed. In this approach the gradient of the objective function, J, with respect to each filter weight is estimated and the weights are updated using this gradient. For example, according to:

$$w_i[c+1] = w_i[c] - \mu \frac{\delta J}{\delta w_i}\bigg|_{w_i[c]}$$

where:
μ is the step size.

Devices cannot operate in Full Duplex (FD) mode until the tuning algorithm has converged. As a result it is desirable to use an adaptive algorithm that converges quickly to appropriate filter weights. This need is particularly apparent for applications where the self-interference channel has a short coherence time, e.g. due to mobility in a wireless channel. In these applications the properties of the self-interference channel change regularly. As a result, the appropriate weights need to be calculated quickly to adapt to these changes in the environment. For example, in the case of a weather radar, the Self-Interference cancellation circuit may need to retune whenever the parabolic dish rotates to account for changes in near-field reflections.

The convergence speed of existing steepest descent methods depends significantly on the step size, $\mu$. If the step size, $\mu$, is too small then convergence will be slow. If the step size, $\mu$, is too large the tuning algorithm may be prevented from converging altogether.

Figure 3:
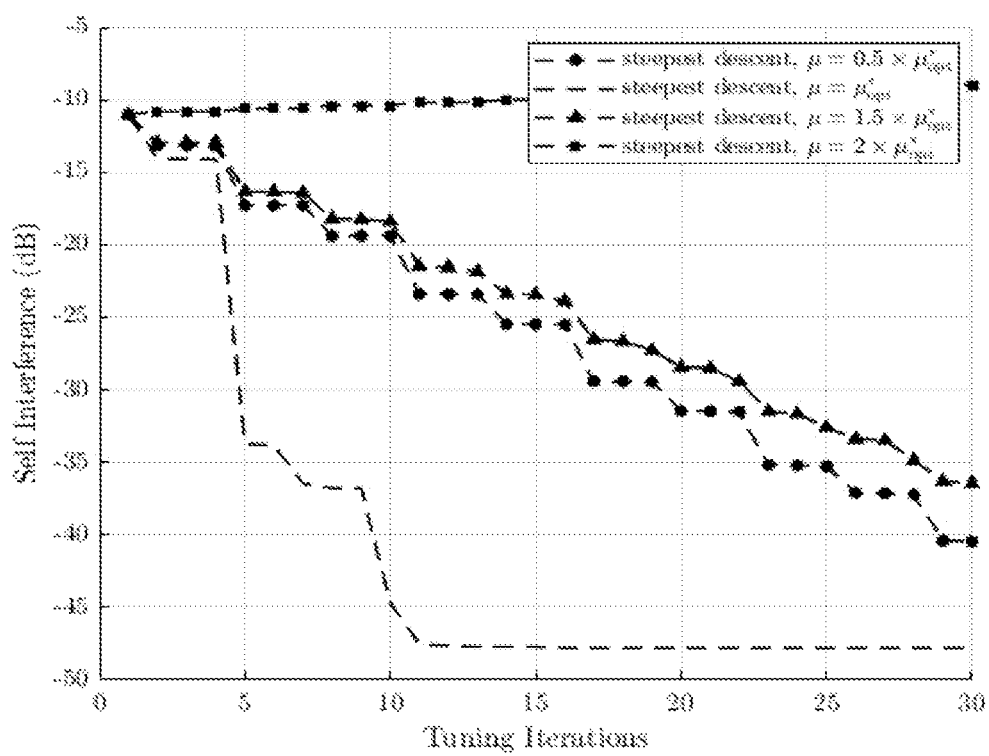
FIG. 3 shows the convergence of conventional steepest descent tuning with different step sizes.

FIG. 3 shows the convergence of conventional steepest descent tuning with different step sizes. FIG. 3 shows that when the step size is larger than the optimum (i.e. $2 \times \mu_{opt}$) the weights of the self-interference cancellation filter do not converge on the optimum weights. As a result, the self-interference does not reduce with tuning.

FIG. 3 also shows a step size that is smaller than the optimum (i.e. $0.5 \times \mu_{opt}$). In this case the weights of the self-interference cancellation filter converge on appropriate weights as the filter is tuned (i.e. as the number of tuning iterations increases). However because the step size is smaller than the optimum, the convergence on appropriate filter weights (i.e. weights that result in a low level of self-interference) takes longer than the example where the step size is selected as the optimum step size (i.e. $\mu_{opt}$).

FIG. 3 demonstrates the trade-off between convergence speed and stability. A small step size will be more likely to converge on the optimum filter weights for self-interference cancellation. However, a small step size will often be associated with a slow converge speed. In contrast a larger step size will have a higher converge speed, however the algorithm will have a lower stability.

The optimum step size (i.e. $\mu_{opt}$) depends on the impulse response of cancellation taps, $g_i[n]$, and will generally not be known. In practice, many designs use manual online tuning to find an appropriate step size, $\mu$. This approach can be undesirable.

Unlike previous approaches, the method described herein estimates the second derivative of the cost function to calculate an appropriate step size that enables quick convergence on the optimal filter weights. This approach removes the need for manual tuning of the step size and ensures a correct balance is struck between convergence speed and stability.

The method discussed below is based on a numerical coordinate-wise implementation of Newton's approach (also known as the secant method). Applying Newton's method the optimal filter weights can be found iteratively from any starting point, $w_i[c]$, by using:

$$w_i[c+1] = w_i[c] - \alpha \frac{\left.\frac{\delta J}{\delta w_i}\right|_{w_i[c]}}{\left.\frac{\delta^2 J}{\delta w_i^2}\right|_{w_i[c]}}$$

Where:
$w_i[c]$ is a weight of a filter tap i at iteration c;
$w_i[c+1]$ is a weight of a filter tap i at iteration c+1;
$\alpha$ is a parameter with $0 < \alpha \leq 1$;

$$\left.\frac{\delta J}{\delta w_i}\right|_{w_i[c]}$$

is the first derivative or the least squares test function with respect to the weight of the $i^{th}$ filter tap evaluated with the parameters at iteration c; and $$\left.\frac{\delta^2 J}{\delta w_i^2}\right|_{w_i[c]}$$

is the second derivative of the least squares test function with respect to the weight of the $i^{th}$ filter tap evaluated with the parameters at iteration c.

Since the least squares cost function, J, is quadratic, the second derivative is constant for each weight, $w_i$ (i.e. the value of the second derivative does not depend on $w_i$). The Newton coordinate method is therefore equivalent to using a gradient descent method with a different step size for each weight, i.e.:

$$w_i[c+1] = w_i[c] - \mu_i \left.\frac{\delta J}{\delta w_i}\right|_{w_i[c]}$$

Where:
the step size, $\mu$, is calculated using the second derivative, i.e.:

$$\mu_i = \alpha \bigg/ \frac{\delta^2 J}{\delta w_i^2}$$

Setting the parameter $\alpha$ equal to one (i.e. $\alpha=1$) gives the optimum step sizes and is mathematically equivalent (i.e. generates the same results) as using the co-ordinate least squares method. However, as discussed above, using the co-ordinate least squares approach in its standard form to tune the self-interference cancellation filter can be challenging in practice because the impulse response of the filter taps is not known.

In practice the first and second derivatives are unknown because, for example, the self-interference channel impulse response, $h_{SI}[n]$ and the cancellation tap impulse response, $g_i[n]$ are not directly measurable. Consequently the first and second derivatives must be estimated during tuning.

In the following method, while tuning of the self-interference cancellation filter is taking place a desired signal component is not received (e.g. when used in a communication system, the other communication nodes do not transmit during the tuning procedure). Consequently, the received signal, y[n] equals:

$$y[n] = h_{SI}[n] * x[n] + (\sum_i w_i g_i[n]) * x[n] + \eta[n]$$

Transmitting a single short pulse with power P, i.e. $x[n] = \sqrt{P}\delta[n]$, where $\delta[n]$ is a unit impulse results in the received signal, y[n], equal to:

$$y[n] = \sqrt{P} h_{SI}[n] + \sqrt{P} \sum_i w_i g_i[n] + \eta[n]$$

The Received Signal Strength Indicator (RSSI) of the received signal is minimised by weights corresponding to the least square solution. This is because the Self-Interference cancellation filter will cancel the maximum amount self-interference when the filter is optimally configured. In this case the Received Signal Strength Indicator (RSSI) will be minimised. Since the self-interference level is initially much greater than the noise level it can be assumed that the Received Signal Strength Indicator (RSSI) is an approximation of the cost function, $J(w_1, \ldots, w_L)$, i.e.:

$$RSSI(w_1, \ldots, w_L) = \sum_n |y[n]|^2 \approx P \cdot J(w_1, \ldots, w_L)$$

As discussed above, the derivatives of the cost function $J(w_1, \ldots, w_L)$ are used to determine an appropriate step size. The numerical derivative is estimated by perturbing the filter weights by a small amount (i.e. applying a small phase shift and a small change in the attenuation provided by the filter) and measuring the change in the Received Signal Strength Indication (RSSI).

The baseband equivalent effect of the variable phase shift, $\theta_i$, and variable attenuator, $A_i$, on cancellation path i is described by a complex weight, $w_i$, where: $w_i = A_i e^{j\theta_i}$. The complex weight of cancellation path i can also be represented in the Cartesian complex plane with a real and an imaginary component. In this case the weight of the $i^{th}$ cancellation path at time c is represented as:

$$w_i[c] = w_i^{re}[c] + jw_i^{im}[c]$$

The derivate of the real part of each filter weight is estimated by individually perturbing the filter weight by a small delta, i.e. by $\pm\Delta$ using finite difference formulae. For example:

$$\left.\frac{\delta J}{\delta w_i^{re}}\right|_{w_i[c]} \approx \frac{RSSI(w_i[c] + \Delta) - RSSI(w_i[c] - \Delta)}{2P\Delta}$$

$$\left.\frac{\delta^2 J}{\delta w_i^{re2}}\right|_{w_i[c]} \approx \frac{RSSI(w_i[c] + \Delta) - 2RSSI(w_i[c]) + RSSI(w_i[c] - \Delta)}{P\Delta^2}$$

The perturbation size (or delta), $\Delta$, is chosen to balance accurately calculating the gradient (e.g. a smaller delta $\Delta$ produces a more accurate approximation of the derivative) and mitigating the effect of noise (e.g. a larger delta $\Delta$ reduces the effect of noise on the estimated derivative).

In a similar way, the first derivative of the cost function with respect to the imaginary part of each filter weight can be estimated using perturbations $\pm j\Delta$, i.e.:

$$\left.\frac{\delta J}{\delta w_i^{im}}\right|_{w_i[c]} \approx \frac{RSSI(w_i[c] + j\Delta) - RSSI(w_i[c] - j\Delta)}{2P\Delta}$$

The second derivative of the cost function with respect to the imaginary part of each filter weight can also be estimated according to:

$$\left.\frac{\delta^2 J}{\delta w_i^{im2}}\right|_{w_i[c]} \approx \frac{RSSI(w_i[c] + j\Delta) - 2RSSI(w_i[c]) + RSSI(w_i[c] - j\Delta)}{P\Delta^2}$$

The second derivative of the cost function with respect to the imaginary part of each filter weight is equal to the second derivative of the cost function with respect to the real part of each filter weight. Consequently, as will be apparent from below, only one of the second derivatives needs to be calculated (e.g. either the second derivative of the cost function with respect to the real part of each filter weight or the second derivative of the cost function with respect to the imaginary part of each filter weight) for subsequent use in determining a step size.

In the above example a central difference equation is used to numerically approximate the derivatives of the cost function with respect to the filter weights. However, it will be appreciated that different finite difference equations can also be used to numerically approximate the derivative.

This approach relies on using Received Signal Strength Indication (RSSI) measurements to estimate the cost function, J. When the Received Signal Strength Indication (RSSI) is dominated by noise it stops becoming a good estimate of the cost function, J, and the tuning algorithm stops converging. However, this only occurs when the gradient is small and the Self-Interference (SI) has already been suppressed near to the noise floor (i.e. the filter weights are already close to the optimum weights). This level of optimisation is sufficient for practical applications.

As discussed above, the step size, $\mu$, is calculated using the second derivative according to:

$$\mu_i = \alpha \bigg/ \frac{\delta^2 J}{\delta w_i^2}$$

The step size, $\mu$, is calculated using the numerical approximation based on the Received Signal Strength Indication (RSSI) for the second derivative of the cost function with respect to the real component of the filter tap according to:

$$\mu_i = \alpha \frac{P\Delta^2}{RSSI(w_i[c] + \Delta) - 2RSSI(w_i[c]) + RSSI(w_i[c] - \Delta)}$$

The step size, $\mu$, is the same for both the real and imaginary components of the filter weights. This is because the second derivative of the cost function with respect to the real component of the filter weight is the same as the second derivative of the cost function with respect to the imaginary component of the filter weight. Consequently, the step size, $\mu$, only needs to be calculated once using either of: the second derivate of the cost function with respect to the real component of the filter weight, or the second derivate of the cost function with respect to the imaginary component of the filter weight.

The step size, $\mu$, is calculated using the numerical approximation based on the Received Signal Strength Indication (RSSI) for the second derivative of the cost function with respect to the imaginary component of the filter tap according to:

$$\mu_i = \alpha \frac{P\Delta^2}{RSSI(w_i[c] + j\Delta) - 2RSSI(w_i[c]) + RSSI(w_i[c] - j\Delta)}$$

The real part of the filter tap for the $i^{th}$ cancellation path is then updated as:

$$w_i[c+1] = w_i[c] - \frac{\mu_i}{2P\Delta}(w_i[c]+\Delta) - w_i[c]-\Delta)) \text{ or}$$

$$w_i[c+1] = w_i[c] - \alpha\frac{\Delta}{2}\frac{RSSI(w_i[c]+\Delta)-RSSI(w_i[c]-\Delta)}{RSSI(w_i[c]+\Delta)-2RSSI(w_i[c])+RSSI(w_i[c]-\Delta)},$$

The imaginary component of the filter tap for the $i^{th}$ cancellation path is also updated in a similar manner using:

$$w_i[c+1] = w_i[c] - j\frac{\mu_i}{2P\Delta}(RSSI(w_i[c]+j\Delta)-RSSI(w_i[c]-j\Delta))$$

In a method according to an embodiment the calculations of the coordinate descent approach described above are repeated for the real and imaginary components of each filter tap. Estimating the first derivatives requires a minimum of two Received Signal Strength Indication (RSSI) measurements (and therefore two short pulse transmissions as part of the tuning). Likewise, estimating the second derivative of the cost function requires a minimum of three Received Signal Strength Indication (RSSI) measurements. Since the second derivate remains constant (i.e. it is not a function of the filter weights) only the first derivative needs to be re-estimated at each tuning iteration after the first iteration. Consequently, the method described herein requires two Received Signal Strength Indication (RSSI) measurements for each real/complex update after the first tuning iteration.

Figure 4:
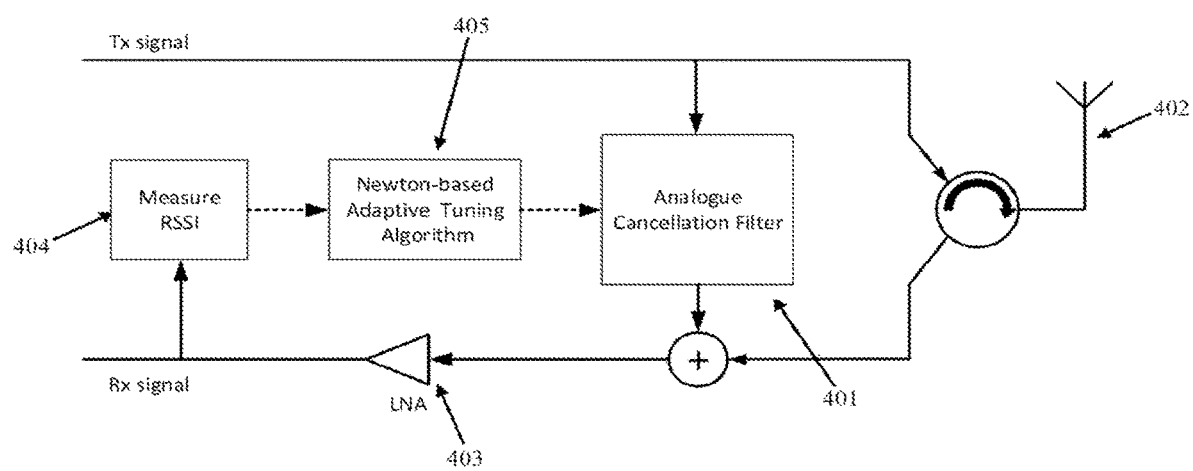
FIG. 4 shows an adaptive Self-Interference Cancellation tuning circuit according to an embodiment.

FIG. 4 shows an adaptive Self-Interference Cancellation tuning circuit according to an embodiment. FIG. 4 shows an adaptive cancellation filter 401 connected to the transmitted signal (Tx signal), which is optionally transmitted via an antenna 402. The output of the adaptive cancellation filter is summed with a desired signal and a signal due to self-interference. The resulting signal is applied to the input of a Low Noise Amplifier (LNA) 403. The output of the Low Noise Amplifier (LNA) 403 is the received signal (Rx Signal). The tuning circuit further comprises a first component 404 configured to measure the Received Signal Strength Indication (RSSI) of the received signal (Rx Signal). Measurements from the first component 404 are used by a second component 405 configured to implement a newton-based adaptive tuning algorithm as discussed above. Updated filter weights are generated by the second component 405, and the second component 405 subsequently updates the filter weights of the analogue cancellation filter 401.

As will be appreciated, the first component 404 and the second component 405 can each be implemented in hardware, software or middleware (e.g. using a Field Programmable Gate Array (FPGA)). Furthermore, although the tuning circuit shows the first component 404 and the second component 405 as separate components it will be appreciated that the functionality of each component could be combined in a single component.

Figure 5:
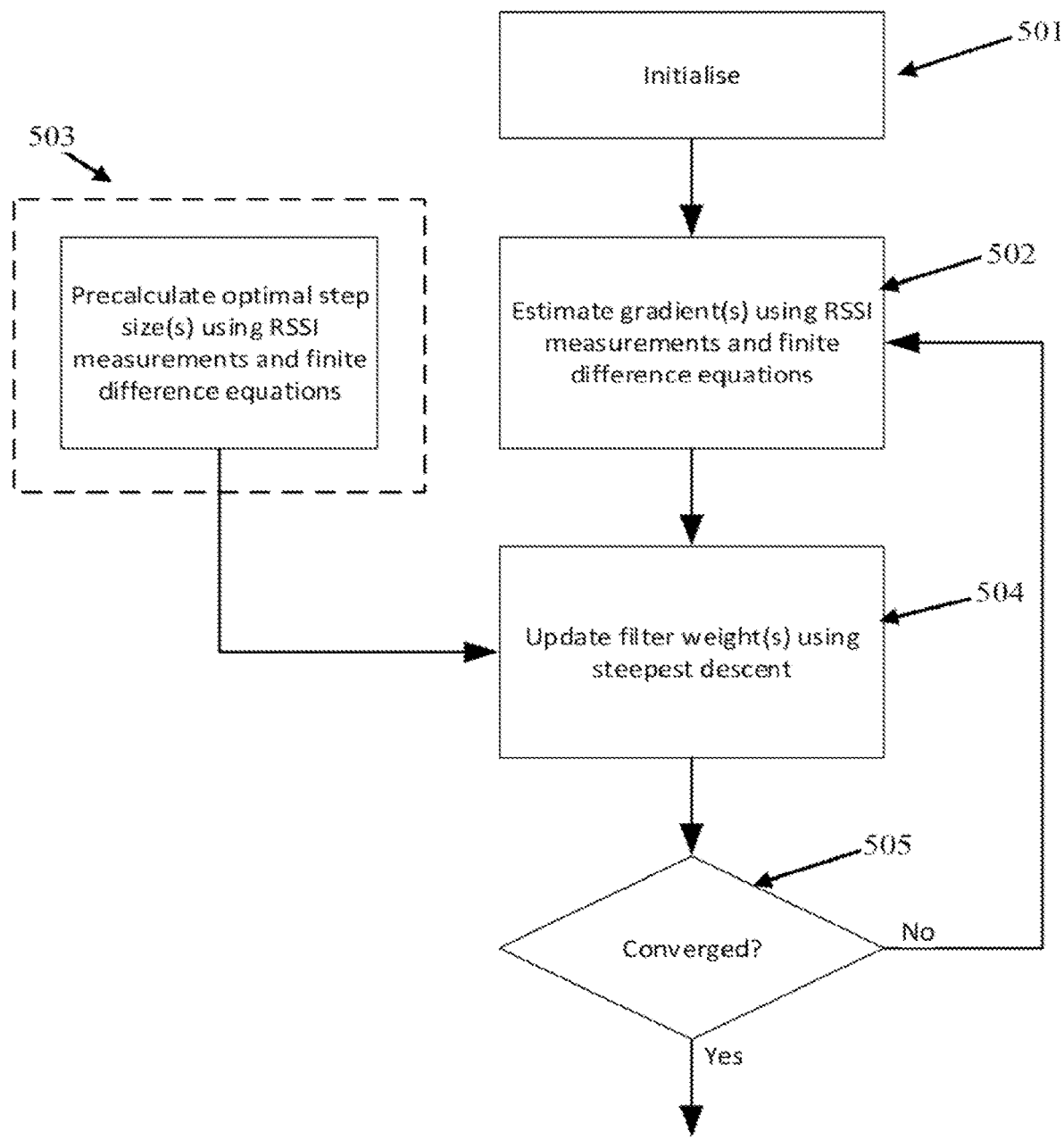
FIG. 5 shows a method for tuning a self-interference cancellation circuit according to an embodiment.

FIG. 5 shows a method for tuning a self-interference cancellation circuit according to an embodiment. In step 501 the weights of the self-interference cancellation filter are initialised. Optionally the weights of the self-interference cancellation filter are initialised with predetermined values. In another example the weights of the self-interference cancellation filter are initialised with random values. In a further example the weights of the self-interference cancellation filter are initialised with the weights that where generated when the method converged during a previous tuning procedure.

In step 502 the gradients (i.e. the first and second derivatives) of the cost function, $J(w_1, \ldots, w_L)$, are estimated using Received Signal Strength Indication (RSSI) measurements and finite difference equations. Various known finite difference equations can be used to numerically approximate the derivatives.

In an embodiment, in step 502, a communication system (which comprises the self-interference cancellation circuit) transmits a plurality of short pulse with power P, i.e. $x[n]=\sqrt{P}\delta[n]$. In the first iteration the plurality of short pulses comprises at least three pulses for each of the real and imaginary filter coefficients. While transmitting the short pulses any other nodes in the communication network do not transmit. A first short pulse is transmitted. In response the Received Signal Strength Indication (RSSI) of the received signal is measured (i.e. $RSSI(w_i[c])$).

Next, the real part of a filter weight for a first cancellation tap is perturbed by a small delta, $\Delta$. Specifically the delta, $\Delta$, is added to the filter weight of the first cancellation tap (i.e. $w_i[c]+\Delta$). A second short pulse is then transmitted. In response the received Signal Strength Indication (RSSI) of the received signal is measured (i.e. $RSSI(w_i[c]+\Delta)$). The real part of the filter weight for the first cancellation tap is modified to subtract the delta, $\Delta$, from the original weight (i.e. $w_i[c]-\Delta$).

A third short pulse is then transmitted. In response the Received Signal Strength Indication (RSSI) of the received signal is measured (i.e. $RSSI(w_i[c]-\Delta)$). The first derivative of the cost function with respect to the real co-efficient of the $i^{th}$ filter tap is then calculated according to:

$$\left.\frac{\delta J}{\delta w_i^{re}}\right|_{w_i[c]} \approx \frac{RSSI(w_i[c]+\Delta)-RSSI(w_i[c]-\Delta)}{2P\Delta}$$

The second derivative of the cost function with respect to the real tap of the $i^{th}$ filter tap is calculated according to:

$$\left.\frac{\delta^2 J}{\delta w_i^{re2}}\right|_{w_i[c]} \approx \frac{RSSI(w_i[c]+\Delta)-2RSSI(w_i[c])+RSSI(w_i[c]-\Delta)}{P\Delta^2}$$

A similar routine is followed for approximating the first and second derivatives of the cost function with respect to the imaginary co-efficient of the $i^{th}$ filter tap using the equations discussed above. In this case the perturbation of the filter taps is by $\pm j\Delta$. Consequently the Received Signal Strength Indication (RSSI) of the received signal is again measured at $w_i[c]$, $w_i[c]+j\Delta$, and $w_i[c]-j\Delta$ (i.e. $RSSI(w_i[c])$, $RSSI(w_i[c]+j\Delta)$, $RSSI(w_i[c]-j\Delta)$). As will be appreciated, if the coefficients $w_i[c]$ are the same as when the real coefficient of the filter tap were perturbed, then the Received Signal Strength Indication (RSSI) (i.e. $RSSI(w_i[c])$) can be re-used without transmitting a further pulse.

In an embodiment, only the second derivate of the cost function with respect to the imaginary co-efficient of the $i^{th}$ filter tap is calculated. In another embodiment, only the second derivate of the cost function with respect to the real co-efficient of the $i^{th}$ filter tap is calculated.

In step 503 the optimal step size, $\mu_i$, is calculated using the approximated second differential of the cost function with respect to either the real filter co-efficient or the imaginary filter co-efficient (depending on which has been calculated), according to:

$$\mu_i = \alpha \bigg/ \frac{\delta^2 J}{\delta w_i^2}$$

Where $\alpha$ is a predetermined parameter between 0 and 1 (i.e. $0 < \alpha \leq 1$).

As discussed above, the second derivate of the cost function with respect to the imaginary co-efficient of the $i^{th}$ filter tap equals the second derivate of the cost function with respect to the real co-efficient of the $i^{th}$ filter tap. Consequently, either of these values can be used to calculate the optimal step size, $\mu_i$.

In the embodiment where Received Signal Strength Indication (RSSI) measurements and finite difference equations are used to numerically approximate the second derivative of the cost function with respect to the real-co-efficient, the step size is calculated according to:

$$\mu_i = \alpha \frac{P\Delta^2}{RSSI(w_i[c]+\Delta) - 2RSSI(w_i[c]) + RSSI(w_i[c]-\Delta)}$$

In step 504 the weights of the $i^{th}$ filter tap are updated using the steepest descent algorithm according to:

$$w_i[c+1] = w_i[c] - \mu_i \frac{\delta J}{\delta w_i}\bigg|_{w_i[c]}$$

In the embodiment where Received Signal Strength Indication (RSSI) measurements and finite difference equations are used to numerically approximate the first and second derivative, the updated weight for the $i^{th}$ filter tap (i.e. $w_i[c+1]$), updated with respect to the real co-efficient, is calculated according to:

$$w_i[c+1] = w_i[c] - j\frac{\mu_i}{2P\Delta}(RSSI(w_i[c]+\Delta) - RSSI(w_i[c]-\Delta))$$

When using the step size, $\mu_i$, is calculated in step 503.

Alternatively, the updated weight for the $i^{th}$ filter tap, updated with respect to the real co-efficient, can be calculated according to:

$$w_i[c+1] =$$
$$w_i[c] - \alpha\frac{\Delta}{2}\frac{RSSI(w_i[c]+\Delta) - RSSI(w_i[c]-\Delta)}{RSSI(w_i[c]+\Delta) - 2RSSI(w_i[c]) + RSSI(w_i[c]-\Delta)},$$

When using the Received Signal Strength Indication (RSSI) measurements from step 502.

A similar process is followed for updating the imaginary component of the weights using the update equations described above. However, as discussed above, the second derivative of the cost function with respect to the real co-efficient of the $i^{th}$ filter tap equals the second derivative of the cost function with respect to the imaginary co-efficient of the $i^{th}$ filter tap. As a result, in one example, the second derivative of the cost function is only calculated once (either with respect to the real co-efficient of the filter tap, or the imaginary co-efficient of the filter tap) and this value is used to generate the optimal step size, $\mu_i$, which is subsequently used in the update equations for both the real and imaginary filter weights.

The updated weight for the $i^{th}$ filter tap (i.e. $w_i[c+1]$), updated with respect to the imaginary co-efficient, is calculated according to:

$$w_i[c+1] = w_i[c] - j\frac{\mu_i}{2P\Delta}(RSSI(w_i[c]+j\Delta) - RSSI(w_i[c]-j\Delta))$$

In step 505 it is determined whether the self-interference cancellation filter has sufficiently converged on appropriate filter weights for cancelling the self-interference. Determining whether the tuning algorithm has converged on appropriate filter weights can be achieved in a number of ways including: determining whether a change in the objective function evaluated with the previous filter weights and the current filter weights is small (e.g. smaller than a predetermined threshold).

In another example the tuning algorithm may be determined to have converged on appropriate filter weights if the updated filter weights calculated in step 504 differ by less than a predetermined threshold from the previous filter weights (i.e. there is only a small change in weights between iterations). However, this approach is less preferred than using the objective function as a small change in the filter weight can sometimes cause a relatively large change in the objective function, thereby indicating that the self-interference cancellation circuit has not converged on an optimum solution that minimises the objective function.

Alternatively the tuning steps (e.g. at least steps 502 and 504) could be carried out for a predetermined number of iterations. In this example, determining whether the self-interference cancellation filter has sufficiently converged comprises determining whether the predetermined number of iterations have been carried out by the method (i.e. whether at least steps 502 and 504 have been repeated a predetermined number of times).

If the tuning algorithm has converged on appropriate filter weights then the tuning algorithm is terminated (at least temporarily) and the communication system continues with its activity (i.e. communicating with other nodes in the network, operating a weather radar etc.). In a further embodiment the tuning algorithm is re-evaluated, started from step 501, after a predetermined time has elapsed since the algorithm converged on appropriate filter weights.

If in step 505 it is determined that the tuning algorithm has not sufficiently converged on appropriate filter weights then the method proceeds to step 502 where another tuning iteration is performed.

For the second and each subsequent tuning iteration, only two Received Signal Strength Indication (RSSI) measurements are required in order to recalculate the first differential of the cost function with respect to the filter weights, i.e.:

$$\frac{\delta J}{\delta w_i^{re}}\bigg|_{w_i[c]} \approx \frac{RSSI(w_i[c]+\Delta) - RSSI(w_i[c]-\Delta)}{2P\Delta}$$

Consequently, for the second tuning iteration a minimum of two short pulses are transmitted for the real and complex weight for each filter tap. Before transmitting pulses, the filter tap calculated in step 504 is perturbed by ±Δ as discussed above and the subsequently measured Received Signal Strength Indication (RSSI) measurements are used to calculate an updated first derivative. A similar process is followed for re-calculating the first derivative of the cost function with respect to the complex co-efficient of the filter tap. The filter weight is subsequently updated in step 504 as discussed above.

Since the second differential remains constant, only the first derivative needs to be re-estimated each tuning iteration.

Although the method is described above is described in relation to the $i^{th}$ filter tap it will be appreciated that the tuning algorithm can be applied to each filter tap of the cancellation filter.

When applied to each filter tap, step 502 is repeated for each filter tap of the cancellation filter before each filter tap is updated in step 504.

In the above described method the adaptive tuning process is performed by adjusting complex filter weights, $w_i$. However the method can alternatively be performed by directly varying the phase shift, $\theta_i$, and attenuation, $A_i$, imparted by each cancellation tap on the transmit signal. In this case the phase shift and the attenuation imparted by each tap are separately updated in turn. When the tuning algorithm adjusts the attenuation and phase shift provided by a filter tap (as opposed to adjusting the complex filter weight) the step size, μ, is re-estimated at each iteration of the tuning algorithm. This is different to when the complex weight is updated where a single step size estimation can (although does not have to be) used for all iterations.

Figure 6:
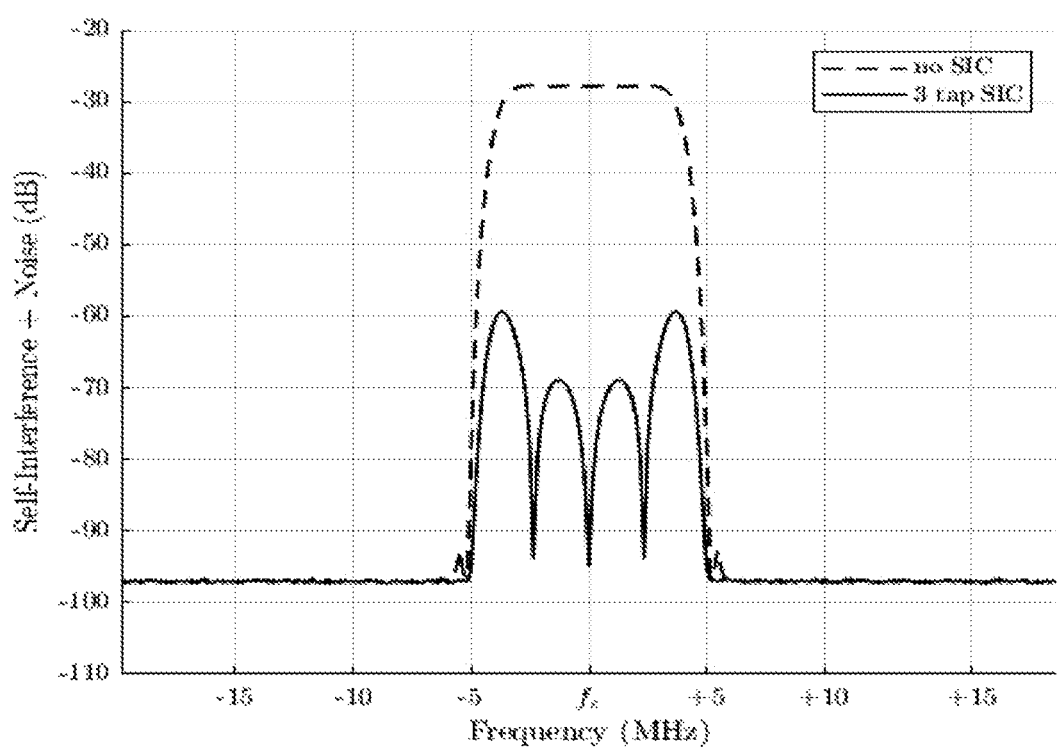
FIG. 6 shows the self-interference cancellation performance of the proposed scheme according to an embodiment.

FIG. 6 shows the self-interference cancellation performance of the proposed scheme according to an embodiment. FIG. 6 shows the performance of a self-interference cancellation filter with 3 cancellation taps which are used to cancel the self-interference through a single dominant self-interference leakage path. In FIG. 6 the self-interference cancellation obtained using the scheme discussed above is compared to the self interference present in an arrangement without a self-interference filter. As can be seen from FIG. 6, an average of 35 decibels (dB) of self-interference cancellation over 10 MHz bandwidth is achieved by the 3 tap self-interference cancellation filter tuned using the above-described technique.

Figure 7:
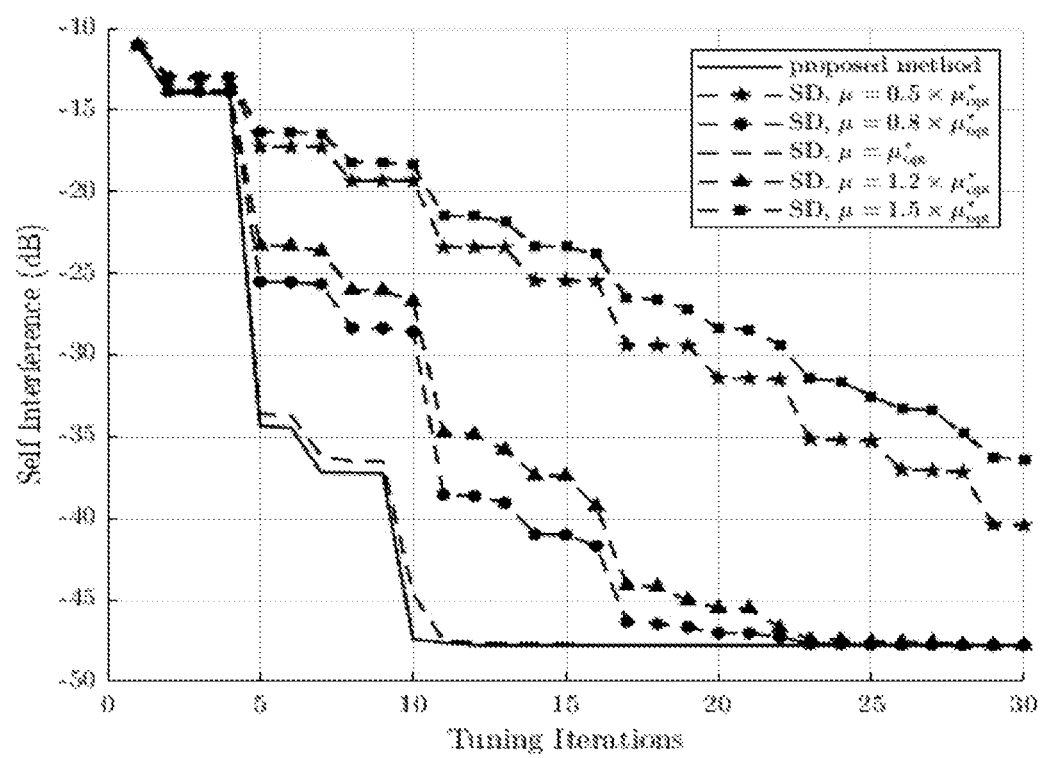
FIG. 7 shows a comparison of convergence rates for the method of tuning according to an embodiment and the steepest descent algorithm.

FIG. 7 shows a comparison of convergence rates for the method of tuning according to an embodiment and the steepest descent algorithm. FIG. 7 shows that the approach described herein converges to optimum filter weights in fewer iterations than the steepest decent algorithm. Furthermore, the method described herein avoids the large tuning time penalty that can occur with the steepest decent algorithm when a sub-optimal step size is chosen (for example, when the step size is too small or too large). Additionally the method described herein also adapts to changes that affect the properties of the cancellation circuit and is therefore robust against any changes in the cancellation tap impulse response.

In contrast to previous approaches the methods described herein are based on Newton's method and use Received Signal Strength Indication (RSSI) measurements to estimate the second derivative of a least squares cost function. This allows the method to determine a step size for weight updates that rapidly converges on appropriate filter weights and removes the need for manual tuning of the step size.

The methods of tuning a Self-Interference cancellation filter described herein have many applications including, but not limited to, use in pulse compression radars such as a weather radar. In this case the Full Duplex (FD) transmission can be used to reduce the minimum detection distance by allowing reflections to be received while the radar is still transmitting. Using a Full Duplex (FD) system in this way is possible due to the self-interference cancellation filter, which is tuned according to the methods described above.

Since all Full Duplex (FD) devices use an analogue Radio Frequency (RF) self-interference cancellation (SIC) stage to ensure the signal has the correct dynamic range before entering the Low Noise Amplifier (LNA), the method described herein has wide applicability.

Figure 8:
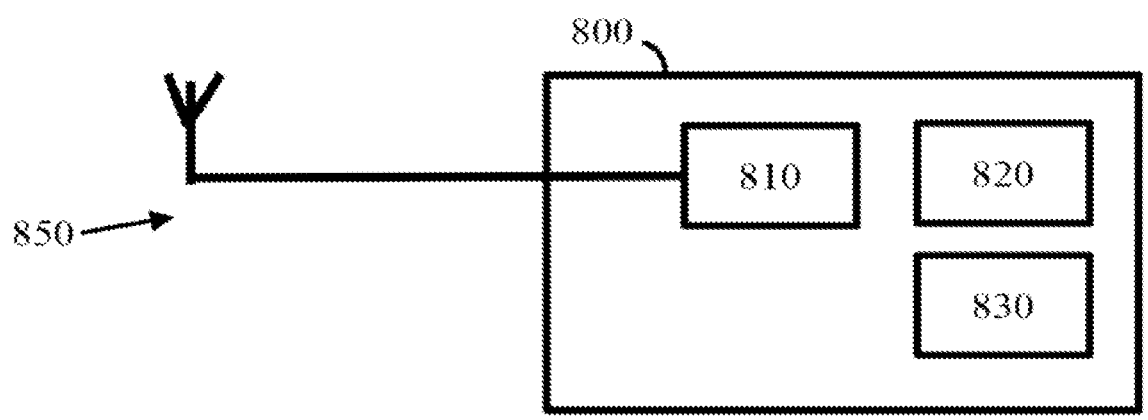
FIG. 8 shows a Full Duplex system according to an embodiment.

FIG. 8 shows a Full Duplex system according to an embodiment. The system 800 comprises an input/output module 810, a processor 820 and a non-volatile memory 830. The input/output module 810 is communicatively connected to an antenna 850. The antenna 850 is configured to transmit and receive wireless signals. The input/output module 810 comprises the analogue cancellation filter 401, the low noise amplifier 403 and means to measure the Received Signal Strength Indication (RSSI) 404 as discussed in relation to FIG. 4. The processor 820 is coupled to the input/output module 810 and to the non-volatile memory 830. The non-volatile memory 830 stores computer program instructions that, when executed, cause the processor 820 to execute program steps that cause tuning of the self-interference cancellation filter based Received Signal Strength Indication (RSSI) measurements as discussed above.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of tuning a self-interference cancellation circuit, wherein the self-interference cancellation circuit comprises a filtering means configured to vary a phase and an amplitude of a transmit signal based on a first filter weight, the method comprising:
   transmitting a first transmit signal,
   receiving a first received signal in response to transmitting the first transmit signal;
   estimating, based on the first received signal, a first derivative of a cost function with respect to the first filter weight;
   estimating, based on the first received signal, a second derivative of the cost function with respect to the first filter weight;
   determining a first step size based on the second derivative;
   calculating an updated first filter weight based on the first filter weight, the first step size, and the first derivative; and
   updating the filtering means based on the updated first filter weight.

2. The method according to claim 1, wherein the first step size is calculated according to a first predetermined number divided by the second derivative of the cost function with respect to the first filter weight.

3. The method according to claim 2, wherein:
   estimating the first derivative of the cost function with respect to the first filter weight further comprises:
      numerically estimating the first derivative the cost function with respect to the first filter weight based on a Received Signal Strength Indication (RSSI) of
the first received signal; and
estimating the second derivative of the cost function with
respect to the first filter weight further comprises:
numerically estimating the second derivative of the cost
function with respect to the first filter weight based
on the Received Signal Strength Indication (RSSI) of
the first received signal.

4. The method according to claim 3, wherein the first derivative of the cost function and the second derivative of the cost function are numerically estimated using a central difference formula.

5. The method according to claim 4, further comprising:
varying the first filter weight by a first delta before
transmitting the first transmit signal;
varying the first filter weight by a second delta after
receiving the first received signal;
re-transmitting the first transmit signal; and
receiving a second received signal in response to re-transmitting the first transmit signal, wherein:
numerically estimating the first derivative of the cost
function with respect to the first filter weight comprises:
calculating a first Received Signal Strength Indication
($RSSI(w_i[c]+\Delta)$) of the first received signal, wherein
the first received signal is received in response to
transmitting the first transmit signal with the first
filter weight varied by the first delta;
calculating a second Received Signal Strength Indication (($RSSI(w_i[c]-\Delta)$) of the second received signal,
wherein the second received signal is received in
response to re-transmitting the first transmit signal
with the first filter weight varied by the second delta;
and
calculating the first derivative of the cost function with
respect to the first filter weight based on the first
Received Signal Strength Indication ($RSSI(w_i[c]+\Delta)$) of the first received signal and the second
Received Signal Strength Indication (($RSSI(w_i[c]-\Delta)$) of the second received signal.

6. The method according to claim 5, further comprising:
re-transmitting the first transmit signal without varying
the first filter weight; and
receiving a third received signal in response to re-transmitting the first transmit signal without the first filter
weight being varied;
wherein, numerically estimating the second derivative of
the cost function with respect to the first filter weight
further comprises:
calculating a third Received Signal Strength Indication
($RSSI(w_i[c])$) of the third received signal; and
calculating the second derivative of the cost function
with respect to the first filter weight based on the first
Received Signal Strength Indication ($RSSI(w_i[c]+\Delta)$), the second Received Signal Strength Indication
($RSSI(w_i[c]-\Delta)$) and the third Received Signal
Strength Indication ($RSSI(w_i[c])$).

7. The method according to claim 1, wherein:
the cost function is a least squares cost function; and
the cost function is based on a self-interference signal
impulse response and an impulse response of the filtering means.

8. The method according to claim 1, further comprising:
determining whether the first filter weight has converged
after updating the filtering means; and
in response to determining that the first filter weight has
not converged:

estimating a second first derivative of the cost function
with respect to the first filter weight;
calculating a second updated first filter weight based on
the first filter weight, the first step size, and the
second first derivative; and
updating the filtering means based on the second
updated first filter weight.

9. A method of operating a transceiver, the transceiver comprising a transmit path, a receive path and a self-interference cancellation circuit communicatively coupled between the transmit path and the receive path, the method comprising:
tuning the self-interference cancellation circuit according
to claim 1;
transmitting a second transmit signal via the transmit
path;
generating, by the self-interference cancellation circuit, a
self-interference cancellation signal based on the second transmit signal;
receiving a second received signal via the receive path;
and
cancelling, based on the second received signal and the
self-interference cancellation signal, at least a portion
of a self-interference that is present in the second
received signal.

10. An apparatus for self-interference cancellation comprising a filtering means configured to vary a phase and an amplitude of a transmit signal based on a first filter weight, wherein the apparatus is configured to
transmit a first transmit signal,
receive a first received signal in response to transmitting
the first transmit signal;
estimate, based on the first received signal, a first derivative of a cost function with respect to the first filter
weight;
estimate, based on the first received signal, a second
derivative of the cost function with respect to the first
filter weight;
determine a first step size based on the second derivative;
calculate an updated first filter weight based on the first
filter weight, the first step size, and the first derivative;
and
update the filtering means based on the updated first filter
weight.

11. The apparatus according to claim 10, wherein the apparatus is further configured to calculate the first step size according to a first predetermined number divided by the second derivative of the cost function with respect to the first filter weight.

12. The apparatus according to claim 11, wherein the apparatus is further configured to:
estimate the first derivative of the cost function with
respect to the first filter weight by:
numerically estimating the first derivative the cost
function with respect to the first filter weight based
on a Received Signal Strength Indication (RSSI) of
the first received signal; and
estimate the second derivative of the cost function with
respect to the first filter weight by:
numerically estimating the second derivate of the cost
function with respect to the first filter weight based
on the Received Signal Strength Indication (RSSI) of
the first received signal.

13. The apparatus according to claim 12, wherein the first derivative of the cost function and the second derivative of the cost function are numerically estimated using a central difference formula.

14. The apparatus according to claim 13, wherein the apparatus is further configured to:
  vary the first filter weight by a first delta before transmitting the first transmit signal;
  vary the first filter weight by a second delta after receiving the first received signal;
  re-transmit the first transmit signal; and
  receive a second received signal in response to re-transmitting the first transmit signal, and wherein:
  when, numerically estimating the first derivative of the cost function with respect to the first filter weight, the apparatus is further configured to:
    calculate a first Received Signal Strength Indication $(RSSI(w_i[c]+\Delta))$ of the first received signal, wherein the first received signal is received in response to transmitting the first transmit signal with the first filter weight varied by the first delta;
    calculate a second Received Signal Strength Indication $((RSSI(w_i[c]-\Delta))$ of the second received signal, wherein the second received signal is received in response to re-transmitting the first transmit signal with the first filter weight varied by the second delta; and
    calculate the first derivative of the cost function with respect to the first filter weight based on the first Received Signal Strength Indication $(RSSI(w_i[c]+\Delta))$ of the first received signal and the second Received Signal Strength Indication $((RSSI(w_i[c]-\Delta))$ of the second received signal.

15. The apparatus according to claim 14, further configured to:
  re-transmit the first transmit signal without varying the first filter weight; and
  receive a third received signal in response to re-transmitting the first transmit signal without the first filter weight being varied;
  wherein, when numerically estimating the second derivative of the cost function with respect to the first filter weight, the apparatus is further configured to:
    calculate a third Received Signal Strength Indication $(RSSI(w_i[c]))$ of the third received signal; and
    calculate the second derivative of the cost function with respect to the first filter weight based on the first Received Signal Strength Indication $(RSSI(w_i[c]+\Delta))$, the second Received Signal Strength Indication $(RSSI(w_i[c]-\Delta))$ and the third Received Signal Strength Indication $(RSSI(w_i[c]))$.

16. The apparatus according to claim 10 wherein:
  the cost function is a least squares cost function; and
  the cost function is based on a self-interference signal impulse response and an impulse response of the filtering means.

17. The apparatus according to claim 10, further configured to:
  determine whether the first filter weight has converged after updating the filtering means; and
  in response to determining that the first filter weight has not converged:
    estimate a second first derivative of the cost function with respect to the first filter weight;
    calculate a second updated first filter weight based on the first filter weight, the first step size, and the second first derivative; and
    update the filtering means based on the second updated first filter weight.

18. A communication apparatus comprising a transmit path, a receive path and an apparatus for self-interference cancellation according to claim 10 communicatively coupled between the transmit path and the receive path, wherein the communication apparatus is configured to:
  tune the apparatus for self-interference cancellation according to the method of claim 1;
  transmit a transmit signal via the transmit path;
  generate, by the apparatus for self-interference cancellation, a self-interference cancellation signal based on the transmit signal;
  receive a received signal via the receive path; and
  cancel at least a portion of a self-interference that is present in the received signal based on the self-interference cancellation signal.

* * * * *